United States Patent
Cruz-Hernandez et al.

(10) Patent No.: US 10,338,683 B2
(45) Date of Patent: Jul. 2, 2019

(54) SYSTEMS AND METHODS FOR VISUAL PROCESSING OF SPECTROGRAMS TO GENERATE HAPTIC EFFECTS

(71) Applicant: Immersion Corporation, San Jose, CA (US)

(72) Inventors: Juan Manuel Cruz-Hernandez, Montreal (CA); Jamal Saboune, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/861,747

(22) Filed: Jan. 4, 2018

(65) Prior Publication Data

US 2018/0136732 A1     May 17, 2018

Related U.S. Application Data

(63) Continuation of application No. 14/051,933, filed on Oct. 11, 2013, now Pat. No. 9,898,086.
(Continued)

(51) Int. Cl.
| | |
|---|---|
| *G09G 5/00* | (2006.01) |
| *G06F 3/01* | (2006.01) |
| *G10L 21/06* | (2013.01) |

(52) U.S. Cl.
CPC .............. *G06F 3/016* (2013.01); *G10L 21/06* (2013.01)

(58) Field of Classification Search
CPC .... G06F 2203/013; G06F 3/011; G06F 3/016; G06F 3/0416; G10L 21/06
(Continued)

(56) References Cited

U.S. PATENT DOCUMENTS

| | | |
|---|---|---|
| 8,493,354 B1 | 7/2013 | Birnbaum et al. |
| 8,717,153 B2 | 5/2014 | Bhatia et al. |
| | (Continued) | |

FOREIGN PATENT DOCUMENTS

| | | |
|---|---|---|
| CN | 101421707 A | 4/2009 |
| CN | 103247296 A | 8/2013 |
| | (Continued) | |

OTHER PUBLICATIONS

European Patent Office Application No. 14183976.1, Extended European Search Report dated Mar. 20, 2015, 7 pages.
(Continued)

*Primary Examiner* — Jennifer T Nguyen
(74) *Attorney, Agent, or Firm* — Kilpatrick Townsend and Stockton LLP (57) ABSTRACT

Systems and methods for visual processing of spectrograms to generate haptic effects are disclosed. In one embodiment, a signal comprising at least an audio signal is received. One or more spectrograms may be generated based at least in part on the received signal. One or more haptic effects may be determined based at least in part on the spectrogram. For example, a generated spectrogram may be a two-dimensional image and this image can be analyzed to determine one or more haptic effects. Once a haptic effect has been determined, one or more haptic output signals can be generated. A generated haptic output signal may be output to one or more haptic output devices.

20 Claims, 6 Drawing Sheets
(3 of 6 Drawing Sheet(s) Filed in Color)

Related U.S. Application Data (60) Provisional application No. 61/874,933, filed on Sep. 6, 2013.

(58) Field of Classification Search
USPC .......... 345/156, 169, 173; 340/407.1, 407.2
See application file for complete search history.

(56) References Cited

U.S. PATENT DOCUMENTS

| | | | |
|---|---|---|---|
| 9,268,845 B1 | 2/2016 | Sharifi et al. | |
| 9,898,086 B2 | 2/2018 | Cruz-Hernandez et al. | |
| 2004/0260540 A1 | 12/2004 | Zhang | |
| 2005/0177372 A1* | 8/2005 | Wang | G06K 9/00536 704/273 |
| 2007/0242040 A1* | 10/2007 | Ullrich | G06F 3/016 345/157 |
| 2009/0231276 A1 | 9/2009 | Ullrich et al. | |
| 2011/0128132 A1 | 6/2011 | Ullrich et al. | |
| 2012/0062491 A1 | 3/2012 | Coni et al. | |
| 2012/0224719 A1* | 9/2012 | Johansson | G08B 6/00 381/98 |
| 2012/0306631 A1* | 12/2012 | Hughes | G09B 21/009 340/407.1 |
| 2014/0129030 A1* | 5/2014 | Zhuge | G05D 19/02 700/275 |
| 2014/0176415 A1* | 6/2014 | Buuck | G06F 3/016 345/156 |
| 2015/0070265 A1* | 3/2015 | Cruz-Hernandez | G10L 21/06 345/156 |

FOREIGN PATENT DOCUMENTS

| | | |
|---|---|---|
| JP | 2008-283305 A | 11/2008 |
| JP | 2009-533714 A | 9/2009 |

OTHER PUBLICATIONS

European Patent Office Application No. 14183976.1, Communication Pursuant to Article 94(3) EPC dated Feb. 6, 2018, 4 pages.
CN 201410452683.4, "Office Action", dated Feb. 13, 2018, 17 pages.
JP 2014-178904, "Office Action", dated Apr. 24, 2018, 5 pages.
CN 201410452683.4, "Office Action", dated Jul. 9, 2018, 6 pages.

* cited by examiner

SYSTEMS AND METHODS FOR VISUAL PROCESSING OF SPECTROGRAMS TO GENERATE HAPTIC EFFECTS

CROSS-REFERENCE TO RELATED APPLICATIONS

This application is a continuation of and claims priority to application Ser. No. 14/051,933, entitled "Systems and Methods for Visual Processing of Spectrograms to Generate Haptic Effects," and filed on Oct. 11, 2013, which claims priority to U.S. Provisional Patent Application No. 61/874,933, filed Sep. 6, 2013, entitled "Audio to Haptics," the entirety of both of which is hereby incorporated by reference herein.

FIELD

The present disclosure relates generally to systems and methods for visual processing of spectrograms to generate haptic effects.

BACKGROUND

Traditionally, mechanical buttons have provided physical tactile sensations to the users of handheld mobile devices. However, with the increase in popularity of touch-sensitive surfaces (e.g., touch screens) on these devices, especially on mobile phones, the mechanical buttons are no longer present. Instead, haptic output devices may be included in such devices to output haptic effects that alert the user to various events.

SUMMARY

Embodiments provide systems and methods for visual processing of spectrograms to generate haptic effects. For example, one disclosed method comprises receiving a signal. In some embodiments, the signal comprises an audio signal, a video signal, an acceleration signal, a velocity signal, a temperature signal, another suitable signal, or a combination thereof.

In some embodiments, the method comprises receiving a signal; generating a spectrogram based at least in part on the signal; determining a haptic effect based at least in part on the spectrogram; generating a haptic output signal based at least in part on the haptic effect, the haptic output signal configured to cause a haptic output device to output the haptic effect; and outputting the haptic output signal.

In another embodiment, a computer-readable medium comprises program code for: receiving a signal; generating a spectrogram based at least in part on the signal; determining a haptic effect based at least in part on the spectrogram; generating a haptic output signal based at least in part on the haptic effect, the haptic output signal configured to cause a haptic output device to output the haptic effect; and outputting the haptic output signal.

In another embodiment, a system comprises: an input device; a haptic output device; and a processor in communication with the input device and the haptic output device. In this embodiment, the processor is configured for: receiving a signal from the input device; generating a spectrogram based at least in part on the signal; determining a haptic effect based at least in part on the spectrogram; generating a haptic output signal based at least in part on the haptic effect, the haptic output signal configured to cause the haptic output device to output the haptic effect; and outputting the haptic output signal to the haptic output device.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of systems and methods for visual processing of spectrograms to generate haptic effects. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Device & Embodiment

Figure 1:
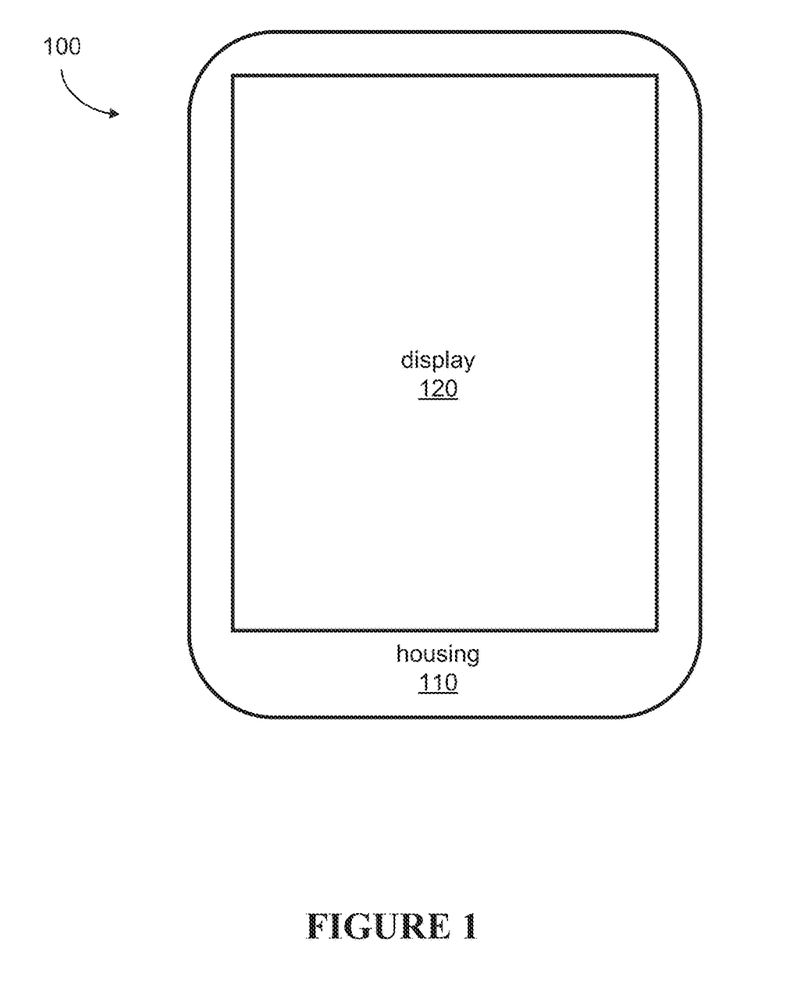
FIG. 1 illustrates an electronic device for visual processing of spectrograms to generate haptic effects in accordance with an embodiment.

FIG. 1 illustrates an electronic device 100 for visual processing of spectrograms to generate haptic effect. In some embodiments, electronic device 100 receives an audio signal. For example, electronic device 100 may receive an audio signal for a song to be played on the electronic device 100. The electronic device 100 can receive the song from memory or from another device, such as from a server through the Internet. Once the electronic device 100 receives the audio signal, the electronic device 100 generates one or more spectrograms based on the received audio signal. The electronic device 100 may generate a spectrogram by determining a Fourier transform of a time window, such as 10 ms, of the time domain of the received audio signal over the entire audio signal. As another example, the electronic device may generate one spectrogram having a horizontal axis representing time, a vertical axis representing a first frequency range (e.g., 0 Hz to 100 Hz) with the magnitude at a particular frequency being represented by a color intensity and another spectrogram having a horizontal axis representing time, a vertical axis representing a second a second frequency range (e.g., 100 Hz to 1 KHz) with the magnitude at a particular frequency being represented by a color intensity.

Once the spectrogram(s) have been generated, one or more haptic effects may be determined by the electronic device 100 by analyzing the generated spectrogram(s). For example, if a spectrogram indicates regions that are spaced apart at regular intervals, then the electronic device 100 may determine that each of the regions is a beat and determine a haptic effect corresponding to a beat. For example, a haptic effect having a vibration of limited duration and a relatively high magnitude that is configured to mimic a beat may be determined. As another example, changes between regions in a spectrogram may indicate a transition from one type of sound to another and, thus, the electronic device 100 may determine a haptic effect before the transition and a different haptic effect during and/or after the transition. Once the haptic effect(s) have been determined, the electronic device 100 can generate haptic output signal(s). The haptic output signals can be output by the electronic device 100 to one or more haptic output devices that output the determined haptic effect(s). Numerous other embodiments are disclosed herein and variations are within the scope of this disclosure.

This illustrative example is given to introduce the reader to the general subject matter discussed herein. The invention is not limited to this example. The following sections describe various additional non-limiting embodiments and examples of devices, systems, and methods for parameter modification of haptic effects.

Illustrative Device

Figure 2:
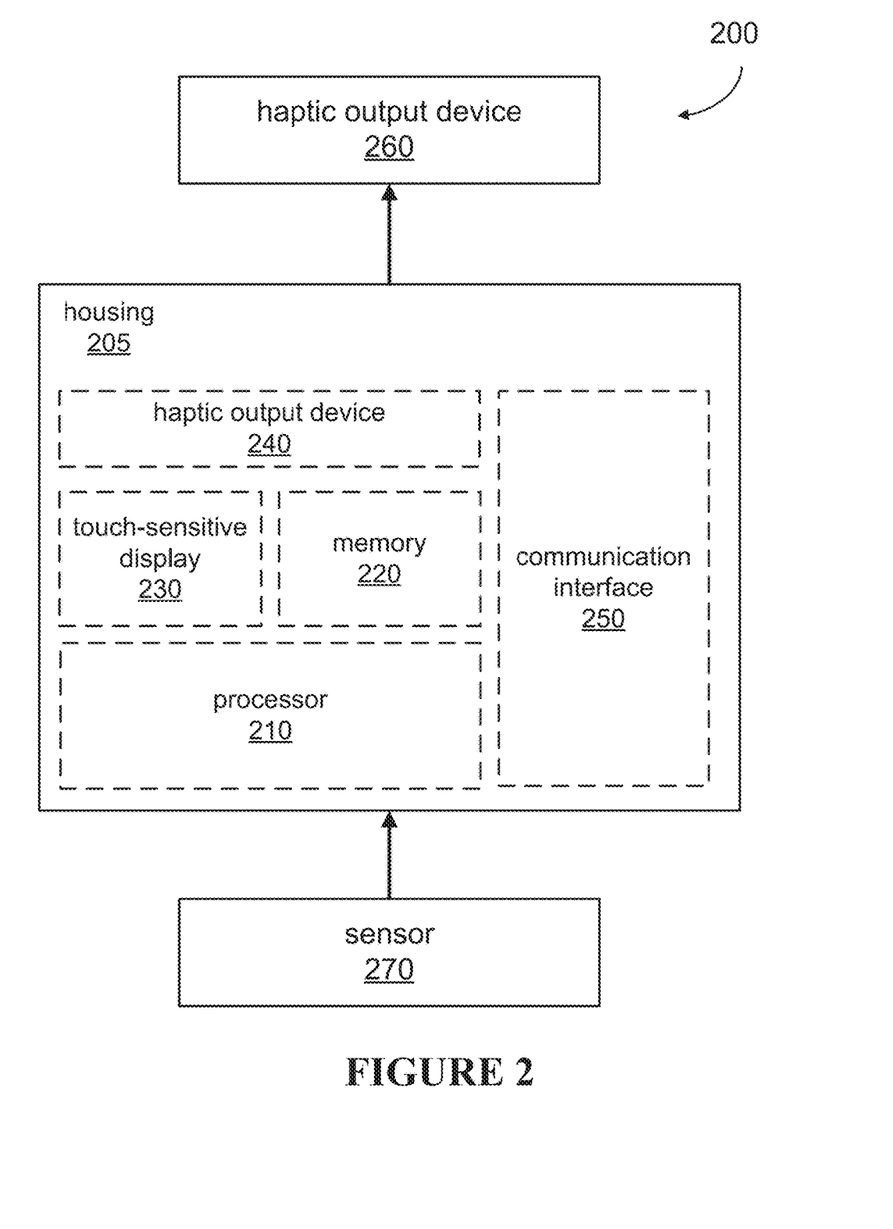
FIG. 2 illustrates an electronic device for visual processing of spectrograms to generate haptic effects in accordance with an embodiment.

FIG. 2 illustrates an electronic device 200 for visual processing of spectrograms to generate haptic effects according to one embodiment. In the embodiment shown in FIG. 2, the electronic device 200 comprises a housing 205, a processor 210, a memory 220, a touch-sensitive display 230, a haptic output device 240, a communication interface 250, and a sensor 270. In addition, the electronic device 200 is in communication with haptic output device 260, which may be optionally coupled to or incorporated into some embodiments. The processor 210 is in communication with the memory 220 and, in this embodiment, both the processor 210 and the memory 220 are disposed within the housing 205. The touch-sensitive display 230, which comprises or is in communication with a touch-sensitive surface, is partially disposed within the housing 205 such that at least a portion of the touch-sensitive display 230 is exposed to a user of the electronic device 200. In some embodiments, the touch-sensitive display 230 may not be disposed within the housing 205. For example, the electronic device 200 may be connected to or otherwise communicate with a touch-sensitive display 230 disposed within a separate housing. In some embodiments, the housing 205 may comprise two housings that are slidably coupled to each other, pivotably coupled to each other, or releasably coupled to each other. In other embodiments, the housing 205 may comprise any number of housings.

In the embodiment shown in FIG. 2, the touch-sensitive display 230 is in communication with the processor 210 and is configured to provide signals to the processor 210 and/or the memory 220 and to receive signals from the processor 210 and/or memory 220. The memory 220 is configured to store program code or data, or both, for use by the processor 210, which is configured to execute program code stored in memory 220 and to transmit signals to and receive signals from the touch-sensitive display 230. In the embodiment shown in FIG. 2, the processor 210 is in communication with the communication interface 250 and is configured to receive signals from the communication interface 250 and to output signals to the communication interface 250 to communicate with other components or devices such as one or more electronic devices. In addition, the processor 210 is in communication with haptic output device 240 and haptic output device 260 and is further configured to output signals to cause haptic output device 240 or haptic output device 260, or both, to output one or more haptic effects.

Furthermore, the processor 210 is in communication with sensor 270 and is configured to receive signals from sensor 270. For example, processor 210 may receive one or more signals from sensor 270 corresponding with one or more interactions with the electronic device 200. For example, one or more sensor signals may be received by processor 210 from sensor 270 when a user of the electronic device 200 shakes the device 200. As another example, one or more sensor signals can be received by processor 210 from sensor 270 when a user presses a location on the touch-sensitive display 230 and/or when a user makes a gesture on touch-sensitive display 230. In some embodiments, processor 210 can receive sensor information from one or more sensors, such as sensor 270, to derive or otherwise determine one or more interactions. Interactions can include, but are not limited to a contact, a series of contacts, a gesture, a contact pressure above a predetermined threshold, a contact pressure below a predetermined threshold, a contact on a flexible touch-sensitive surface such as a flexible touch-screen display, a vibration, a shake, any other suitable interaction, or a combination thereof.

In some embodiments, processor 210 receives one or more sensor signals from one or more input devices integrated into the electronic device 200, connected to the electronic device 200, and/or in communication with the electronic device 200. For example, the processor 210 may receive one or more sensor signals from a touch-sensitive surface of the touch-sensitive display 230. As another example, the processor 210 may receive one or more sensor signals from an input device such as a keyboard, a mouse, a touchpad, a trackball, a microphone, a touch-sensitive surface, and/or another suitable input device that is integrated into the electronic device 200, connected to the electronic device 200, and/or in communication with the electronic device 200. A sensor signal may comprise information such as one or more contacts, locations, pressures, gestures, key presses, and/or other information indicating how a user is interacting with one or more input devices. In some embodiments, a sensor signal and/or a received signal comprises an audio signal, a video signal, an acceleration signal, a velocity signal, a temperature signal, another suitable signal, or a combination thereof. Numerous other embodiments are disclosed herein and variations are within the scope of this disclosure.

The processor 210 may then utilize the information it receives from one or more sensors (such as sensor 270), one or more communication interfaces (such as communication interface 250), memory (such as memory 220), and/or another suitable input device such as a an audio input device and/or an audio/video input device to generate one or more spectrograms. For example, audio received from a microphone may be used to generate one or more spectrograms. As another example, an audio file received from memory may be used to generate one or more spectrograms. In some embodiments, audio received from another device through a communication interface is used to generate one or more spectrograms. A generated spectrogram may include a first axis representing frequencies, a second axis representing time, and intensities (such as color intensities or greyscale intensities) for the frequencies at various times. In some embodiments, the processor 210 analyzes at least a portion of at least one generated spectrogram to determine one or more haptic effects. For example, the processor 210 may analyze a spectrogram to determine whether a pattern can be detected in the spectrogram. In some embodiments where a pattern is detected, the processor 210 may determine that a haptic effect corresponds with the pattern and should be output. In some embodiments, a pattern (or lack thereof) may indicate that a particular haptic effect should be output, that a particular haptic effect should stop being output, or that a haptic effect should be changed from one haptic effect to another haptic effect. Numerous other embodiments are disclosed herein and variations are within the scope of this disclosure.

Once the processor 210 determines one or more effects that should be output, the processor 210 can generate one or more output signals. For example, in one embodiment, one or more output signals are generated by processor 210 in response to determining a pattern in a spectrogram. As another example, one or more output signals can be generated by processor 210 if part of a generated spectrogram indicates that a pattern is ending. Numerous other embodiments are disclosed herein and variations are within the scope of this disclosure.

The device illustrated in FIG. 2 is merely illustrative, and in various other embodiments, the electronic device 200 may comprise or be in communication with fewer or additional components and/or devices than shown in FIG. 2. For example, other user input devices such as a mouse, a keyboard, a camera and/or other input device(s) may be comprised within the electronic device 200 or be in communication with the electronic device 200. As another example, electronic device 200 may comprise or otherwise be in communication with one or more sensors and/or one or more haptic output devices. In another example, electronic device 200 may not comprise a communication interface 250 in one embodiment. As yet another example, electronic device 200 may not be in communication with haptic output device 260 in an embodiment. Numerous other embodiments are disclosed herein and variations are within the scope of this disclosure.

Various other components may also be modified. For example, in some embodiments, sensor 270 is partially or fully disposed within housing 205. As another example, sensor 270 may be disposed within the housing 205 of the electronic device 200. In one embodiment, the electronic device 200 is not in communication with haptic output device 260 and does not comprise communication interface 250. In another embodiment, the electronic device 200 does not comprise a touch-sensitive display 230 or a communication interface 250, but comprises a touch-sensitive surface and is in communication with an external display. In other embodiments, the electronic device 200 may not comprise or be in communication with a haptic output device at all. Thus, in various embodiments, the electronic device 200 may comprise or be in communication with any number of components, such as in the various embodiments disclosed herein as well as variations that would be apparent to one of skill in the art.

The electronic device 200 can be any device that is capable of receiving user input. For example, the electronic device 200 in FIG. 2 includes a touch-sensitive display 230 that comprises a touch-sensitive surface. In some embodiments, a touch-sensitive surface may be overlaid on the touch-sensitive display 230. In other embodiments, the electronic device 200 may comprise or be in communication with a display and a separate touch-sensitive surface. In still other embodiments, the electronic device 200 may comprise or be in communication with a display and may comprise or be in communication with other user input devices, such as a mouse, a keyboard, buttons, knobs, slider controls, switches, wheels, rollers, other manipulanda, or a combination thereof.

In some embodiments, one or more touch-sensitive surfaces may be included on or disposed within one or more sides of the electronic device 200. For example, in one embodiment, a touch-sensitive surface is disposed within or comprises a rear surface of the electronic device 200. In another embodiment, a first touch-sensitive surface is disposed within or comprises a rear surface of the electronic device 200, and a second touch-sensitive surface is disposed within or comprises a side surface of the electronic device 200. In some embodiments, the electronic device 200 may comprise two or more housing components, such as in a clamshell arrangement or in a slidable arrangement. For example, one embodiment comprises an electronic device 200 having a clamshell configuration with a touch-sensitive display disposed in each of the portions of the clamshell. Furthermore, in some embodiments where the electronic device 200 comprises at least one touch-sensitive surface on one or more sides of the electronic device 200 or in some embodiments where the electronic device 200 is in communication with an external touch-sensitive surface, the display 230 may or may not comprise a touch-sensitive surface. In some embodiments, one or more touch-sensitive surfaces may have a flexible touch-sensitive surface. In such embodiments, a user may be able to bend or otherwise deform the flexible touch-sensitive surface as a method of input. For example, in one embodiment, an electronic device has a flexible touch-screen display and a user can deform the flexible touch-screen display by pressing locations on the flexible touch-screen display to input information to the electronic device. In other embodiments, one or more touch-sensitive surfaces may be rigid. In various embodiments, the electronic device 200 may comprise both flexible and rigid touch-sensitive surfaces.

The housing 205 of the electronic device 200 shown in FIG. 2 provides protection for at least some of the components electronic device 200. For example, the housing 205 may be a plastic casing that protects the processor 210 and memory 220 from foreign articles such as rain. In some embodiments, the housing 205 protects the components in the housing 205 from damage if the electronic device 200 is dropped by a user. The housing 205 can be made of any suitable material including but not limited to plastics, rubbers, or metals. Various embodiments may comprise different types of housings or a plurality of housings. For example, in some embodiments, electronic device 200 may be a portable device, handheld device, toy, gaming console, handheld video game system, gamepad, game controller, desktop computer, portable multifunction device such as a cell phone, smartphone, personal digital assistant (PDA), eReader, portable reading device, handheld reading device, laptop, tablet computer, digital music player, remote control, medical instrument, etc. In some embodiments, the electronic device 200 may be embedded in another device such as a vehicle, wrist watch, other jewelry, arm band, gloves, glasses, etc. Thus, in some embodiments, the electronic device 200 is wearable. In an embodiment, the electronic device 200 is embedded in another device such as, for example, the console of a car or a steering wheel. Numerous other embodiments are disclosed herein and variations are within the scope of this disclosure.

In the embodiment shown in FIG. 2, the touch-sensitive display 230 provides a mechanism for a user to interact with the electronic device 200. For example, the touch-sensitive display 230 detects the location or pressure, or both, of a user's finger in response to a user hovering over, touching, or pressing the touch-sensitive display 230 (all of which may be referred to as a contact in this disclosure). In one embodiment, a contact can occur through the use of a camera. For example, a camera may be used to track a viewer's eye movements as the reader views the content displayed on the display 230 of the electronic device 200. In this embodiment, haptic effects may be triggered based at least in part on the viewer's eye movements. For example, a haptic effect may be output when a determination is made that the viewer is viewing content at a particular location of the display 230. In some embodiments, the touch-sensitive display 230 may comprise, be connected with, or otherwise be in communication with one or more sensors that determine the location, pressure, a size of a contact patch, or any of these, of one or more contacts on the touch-sensitive display 230.

For example, in one embodiment, the touch-sensitive display 230 comprises or is in communication with a mutual capacitance system. In another embodiment, the touch-sensitive display 230 comprises or is in communication with an absolute capacitance system. In some embodiments, the touch-sensitive display 230 may comprise or be in communication with a resistive panel, a capacitive panel, infrared LEDs, photodetectors, image sensors, optical cameras, or a combination thereof. Thus, the touch-sensitive display 230 may incorporate any suitable technology to determine a contact on a touch-sensitive surface such as, for example, resistive, capacitive, infrared, optical, thermal, dispersive signal, or acoustic pulse technologies, or a combination thereof. In some embodiments, a determined haptic effect is modified or otherwise configured based at least in part on interactions and/or other information received from one or more sensors that can be used to determine one or more interactions. For example, an intensity parameter of a haptic effect may be increased or decreased based on one or more interactions. In some embodiments, the display is not touch-sensitive. In other embodiments, the electronic device 200 does not have a display.

In the embodiment shown in FIG. 2, haptic output devices 240 and 260 are in communication with the processor 210 and are configured to provide one or more haptic effects. For example, in one embodiment, when an actuation signal is provided to haptic output device 240, haptic output device 260, or both, by the processor 210, the respective haptic output device(s) 240, 260 outputs a haptic effect based on the actuation signal. For example, in the embodiment shown, the processor 210 is configured to transmit a haptic output signal to haptic output device 240 comprising an analog drive signal. In some embodiments, the processor 210 is configured to transmit a command to haptic output device 260, wherein the command includes parameters to be used to generate an appropriate drive signal to cause the haptic output device 260 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

A haptic output device, such as haptic output devices 240 or 260, can be any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a memory shape alloy, a pager, a DC motor, an AC motor, a moving magnet actuator, an E-core actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various embodiments may include a single or multiple haptic output devices and may have the same type or a combination of different types of haptic output devices. In some embodiments, one or more haptic output devices are directly or indirectly in communication with electronic device, such as via wired or wireless communication. In one embodiment, the electronic device can be placed in a vehicle or is integrated into a vehicle and one or more haptic output devices are embedded into the vehicle. For example, one or more haptic output devices may be embedded in a seat, steering wheel, pedal, etc. of the vehicle. In some embodiments, instead of having haptic output device 240 and/or haptic output device 260 or in addition to having haptic output device 240 and/or haptic output device 260, the electronic device 200 has one or more other output devices. For example, the electronic device 200 may have a speaker and/or a display. In one embodiment, the electronic device 200 has one or more haptic output devices, one or more speakers, and one or more displays. Numerous other embodiments are disclosed herein and variations are within the scope of this disclosure.

In various embodiments, one or more haptic effects may be produced in any number of ways or in a combination of ways. For example, in one embodiment, one or more vibrations may be used to produce a haptic effect, such as by rotating an eccentric mass or by linearly oscillating a mass. In some such embodiments, the haptic effect may be configured to impart a vibration to the entire electronic device or to only one surface or a limited part of the electronic device. In another embodiment, friction between two or more components or friction between at least one component and at least one contact may be used to produce a haptic effect, such as by applying a brake to a moving component, such as to provide resistance to movement of a component or to provide a torque. In order to generate vibration effects, many devices utilize some type of actuator and/or other haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys.

In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some embodiments, a haptic effect is a kinesthetic effect.

In FIG. 2, the communication interface 250 is in communication with the processor 210 and provides wired or wireless communications, from the electronic device 200 to other components or other devices. For example, the communication interface 250 may provide wireless communications between the electronic device 200 and a wireless sensor or a wireless actuation device. In some embodiments, the communication interface 250 may provide communications to one or more other devices, such as another electronic device 200, to allow users to interact with each other at their respective devices. The communication interface 250 can be any component or collection of components that enables the multi-pressure touch-sensitive input electronic device 200 to communicate with another component or device. For example, the communication interface 250 may comprise a PCI network adapter, a USB network adapter, or an Ethernet adapter. The communication interface 250 may communicate using wireless Ethernet, including 802.11 a, g, b, or n standards. In one embodiment, the communication interface 250 can communicate using Radio Frequency (RF), Bluetooth, CDMA, TDMA, FDMA, GSM, WiFi, satellite, or other cellular or wireless technology. In other embodiments, the communication interface 250 may communicate through a wired connection and may be in communication with one or more networks, such as Ethernet, token ring, USB, FireWire 1394, fiber optic, etc. In some embodiments, electronic device 200 comprises a single communication interface 250. In other embodiments, electronic device 200 comprises two, three, four, or more communication interfaces. Thus, in some embodiments, electronic device 200 can communicate with one or more components and/or devices through one or more communication interfaces. In other embodiments, an electronic device 200 may not comprise a communication interface 250.

In FIG. 2, the sensor 270 is in communication with the processor 210 and provides sensor information to the processor 210. For example, sensor 270 may provide one or more interactions to the processor 210. The sensor 270 may provide an input signal indicating one or more interactions. As another example, sensor 270 can provide information corresponding to one or more interactions with electronic device 200 to processor 210. In some embodiments, the information the sensor 270 provides to processor 210 corresponds to an interaction with the entire electronic device 200, such as a user shaking the electronic device 200. In other embodiments, the information sensor 270 provides to processor 210 corresponds to an interaction with a part of the electronic device 200, such as a touch-sensitive display 230 or another suitable input device.

The embodiment shown in FIG. 2 depicts a single sensor 270. In some embodiments, multiple sensors can be used. Additionally, a sensor may be housed in the same component as the other components of the electronic device 200 or in a separate component. For example, in some embodiments, the processor 210, memory 220, and sensor 270 are all comprised in an electronic device 200, such as a portable music player, a portable telephone, and/or a wearable device. In some embodiments, a sensor is placed in component separate from another component that houses the memory and/or processor. For instance, a wearable sensor may be in communication with the processor and memory or an electronic device via a wired or wireless connection.

Sensor 270 may comprise any number and/or type of sensing components. For example, sensor 270 can comprise an accelerometer and/or gyroscope. A non-limiting list of examples of sensors and interactions is provided below:

TABLE 1

Exemplary Sensors and Conditions

| Sensor | Interaction Sensed |
|---|---|
| Accelerometer | Force in one, two, or three directions |
| Altimeter | Altitude |
| Thermometer | Ambient temperature; user body temperature |
| Heart rate monitor | Heart rate of device user |
| Skin resistance monitor | Skin resistance of device user |
| Oxygen sensor | Oxygen use of device user |
| Audio sensor/ microphone | Ambient audio and/or audio generated by device user |
| Photosensor | Ambient light |
| IR/Photosensor | User eye movement, position, body temperature |
| Hygrometer | Relative humidity |
| Speedometer | Velocity |
| Pedometer/odometer | Distance traveled |
| Chronometer | Time of day, date |
| Weight | Mass or quantity of matter |

Illustrative System

Figure 3:
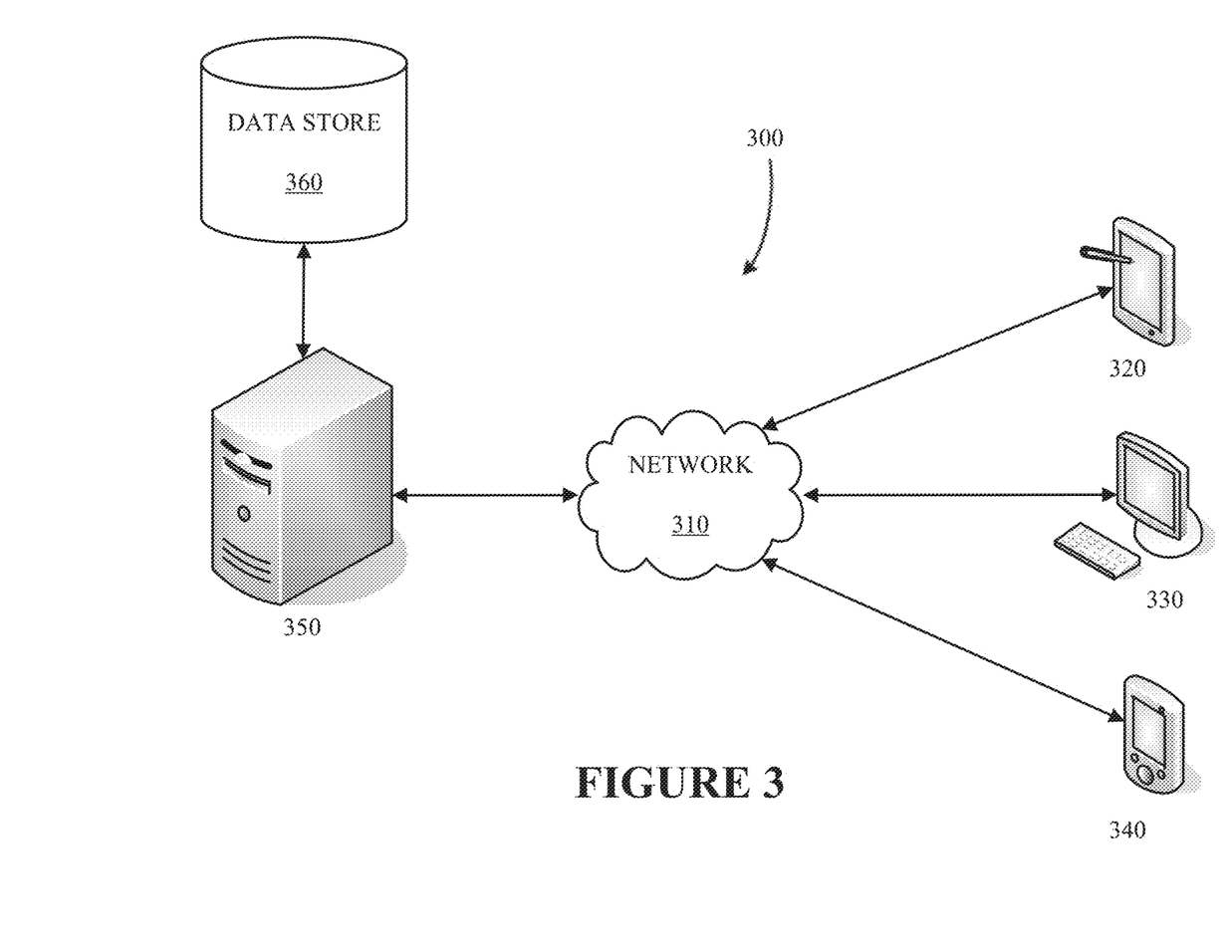
FIG. 3 illustrates a system diagram depicting computing devices for visual processing of spectrograms to generate haptic effects in accordance with an embodiment.

FIG. 3 illustrates a system diagram depicting illustrative computing devices for visual processing of spectrograms to generate haptic effects in an illustrative computing environment according to an embodiment. The system 300 shown in FIG. 3 includes three electronic devices, 320-340, and a web server 350. Each of the electronic devices, 320-340, and the web server 350 are connected to a network 310. In this embodiment, each of the electronic devices, 320-340, is in communication with the web server 350 through the network 310. Thus, each of the electronic devices, 320-340, can send requests to the web server 350 and receive responses from the web server 350 through the network 310.

In an embodiment, the network 310 shown in FIG. 3 facilitates communications between the electronic devices, 320-340, and the web server 350. The network 310 may be any suitable number or type of networks or links, including, but not limited to, a dial-in network, a local area network (LAN), wide area network (WAN), public switched telephone network (PSTN), a cellular network, a WiFi network, the Internet, an intranet or any combination of hard-wired and/or wireless communication links. In one embodiment, the network 310 is a single network. In other embodiments, the network 310 may comprise two or more networks. For example, the electronic devices 320-340 may be connected to a first network and the web server 350 may be connected to a second network and the first and the second network may be connected by a third network. Numerous other network configurations would be obvious to a person of ordinary skill in the art.

An electronic device may be capable of communicating with a network, such as network 310, and capable of sending and receiving information to and from another device, such as web server 350. For example, in FIG. 3, one electronic device 320 is a tablet computer. The tablet computer 320 includes a touch-sensitive display and is able to communicate with the network 310 by using a wireless communication interface card. Another device that may be an electronic device 330 shown in FIG. 3 is a desktop computer. The desktop computer 330 is in communication with a display and is able to connect to the network 330 through a wired network connection. The desktop computer 330 may be in communication with any number of input devices such as a keyboard or a mouse. In FIG. 3, a mobile phone is an electronic device 340. The mobile phone 340 may be able to communicate with the network 310 over a wireless communications means using Bluetooth, CDMA, TDMA, FDMA, GSM, WiFi, or other cellular or wireless technology.

A device receiving a request from another device may be any device capable of communicating with a network, such as network 310, and capable of sending and receiving information to and from another device. For example, in the embodiment shown in FIG. 3, the web server 350 may receive a request from another device (e.g., one or more of electronic devices 320-340) and may be in communication with network 310. A receiving device may be in communication with one or more additional devices, such as additional servers. For example, web server 350 in FIG. 3 may be in communication with another server. In an embodiment, a web server may communicate with one or more additional devices to process a request received from an electronic device. For example, web server 350 in FIG. 3 may be in communication with a plurality of additional servers, at least one of which may be used to process at least a portion of a request from any of the electronic devices 320-340. In one embodiment, web server 350 may be part of or in communication with a content distribution network (CDN).

One or more devices may be in communication with a data store. In FIG. 3, web server 350 is in communication with data store 360. In some embodiments, data store 360 is operable to receive instructions from web server 350 and/or other devices in communication with data store 360 and obtain, update, or otherwise process data in response to receiving the instructions. In one embodiment, an electronic device, such as tablet computer 320, comprises and/or is in communication with a data store. A data store, such as data store 360, may contain electronic content, such as an eBook or magazine, data items, user accounts, metadata, information associated with predefined haptic effects, information associated with predefined events, associations between predefined haptic effects and predefined events, information associated with spectrogram characteristics, associations between spectrogram characteristics and predefined haptic effects, user interactions, user history, information regarding occurrences of events, default parameters for one or more haptic effects, haptic profiles for one or more operating environments, one or more tactile models, minimum and/or maximum parameters for a haptic effect, information regarding generated predefined haptic effects, interactions, parameters, parameter adjustments, correlations between interactions and parameter adjustments, correlations between parameter adjustments and profiles and/or operating modes, correlations between tactile models and interactions, correlations between tactile models and haptic effects, correlations between tactile models and parameters, correlations between profiles and/or operating modes and interactions, other information usable to modify parameters of a haptic effect, information usable to determine an interaction, other information, or a combination thereof.

Data store 360 shown in FIG. 3 can receive requests from web server 350 and send responses to web server 350. For example, web server 350 may receive a request from tablet computer 320 for a predefined haptic effect and a default intensity parameter. In response to receiving the request from the tablet computer 320, web server 350 may query data store 360 for the predefined haptic effect and the default intensity parameter for the predefined haptic effect. In response to receiving the request from the web server 350, data store 360 may send the web server 350 the predefined haptic effect and the default intensity parameter. The web server 350, can send the predefined haptic effect and the default intensity parameter to the tablet computer 320. The tablet computer 320 may modify the default intensity parameter for the predefined haptic effect based at least in part on one or more interactions. For example, if one or more interactions indicate that a greater or otherwise more intense haptic effect should be output, then the tablet computer 320 may increase the intensity parameter above the default intensity parameter. Similarly, if one or more interactions indicate that a lesser or otherwise less intense haptic effect should be generated, then the table computer 320 may decrease the intensity parameter below the default intensity parameter. Numerous other embodiments are disclosed herein and variations are within the scope of this disclosure.

Figure 4:
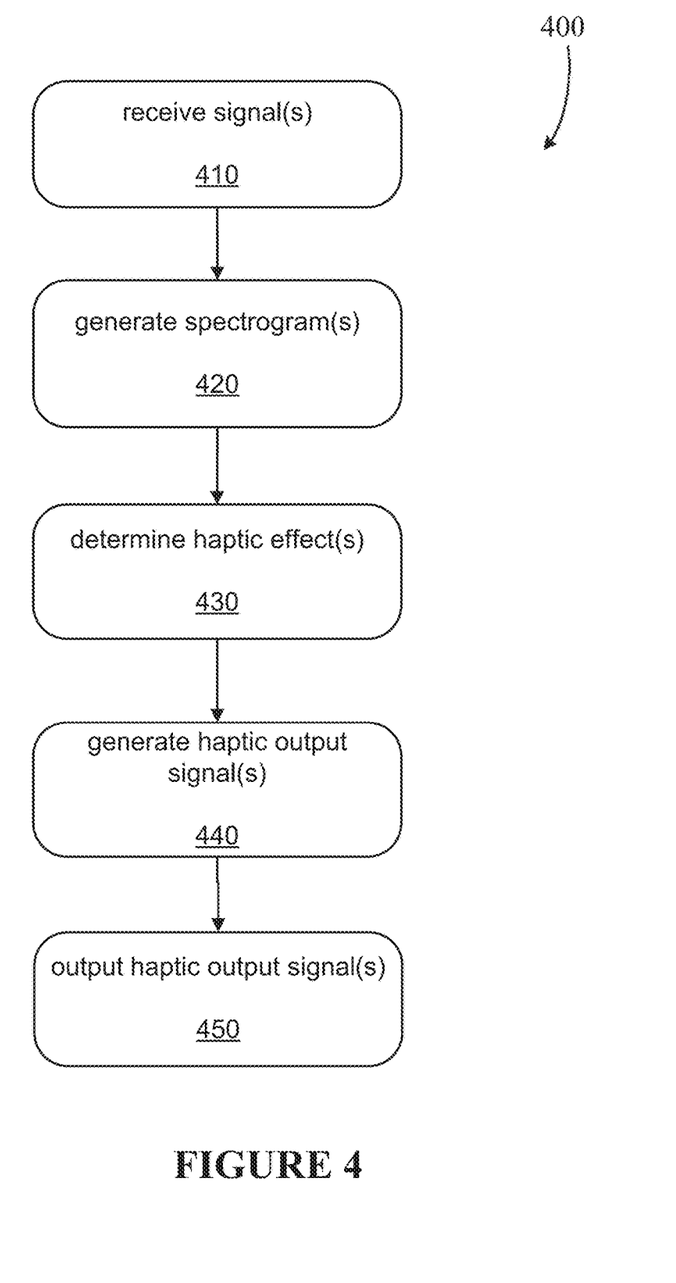
FIG. 4 illustrates a flow chart directed to a method of visual processing of spectrograms to generate haptic effects in accordance with an embodiment.

Illustrative Method of Visual Processing of Spectrograms to Generate Haptic Effects FIG. 4 illustrates a flow chart directed to a method 400 of visual processing of spectrograms to generate haptic effects in accordance with an embodiment. The method 400 shown in FIG. 4 will be described with respect to electronic device 200 shown in FIG. 2. In some embodiments, method 400 can be performed by one or more of the devices shown in system 300 in FIG. 3. The method 400 shown in FIG. 4 will also be described with respect to FIG. 5 which illustrates aspects of visual processing of spectrograms to generate haptic effects in accordance with an embodiment and with respect to FIG. 6 which illustrates aspects of visual processing of spectrograms to generate haptic effects in accordance with an embodiment.

The method 400 begins in block 410 when a signal is received. For example, referring to FIG. 2, an audio signal may be received from memory 220, another device in communication with processor 210 through communication interface 250, and/or via sensor 270. As another example, referring to FIG. 3, in some embodiments tablet computer 320 receives one or more signals, such as an audio signal, from web server 350 and/or data store 360 through network 310.

One or more signals may be received from any number of components. In one embodiment, a file, such as an audio or audio/video file, stored in memory 220 of electronic device 200 is received by processor 210. In some embodiments, a signal is received by processor 210 from another device through communication interface 250. For example, processor 210 may receive an audio file and/or an audio/video file from a web server through communication interface 250. As another example, processor 210 can receive a continuous audio stream, such as streaming radio, from a server through communication interface 250. In some embodiments, processor 210 receives a signal from sensor 270. For example, processor 210 may receive an audio signal from a microphone connected with the electronic device 200. As another example, a microphone may be disposed within housing 205 of the electronic device and the processor 210 receives audio signals from the microphone. In other embodiments, one or more sensor signals are disposed entirely or at least partially within a housing of an electronic device. In one embodiment, processor 210 receives audio information from a sensor of another device through communication interface 250. For example, another electronic device may have a microphone and processor 210 receives audio information from the microphone through communication interface 250 connected with a network, such as network 310 shown in FIG. 3. The one or more received signals can be any number of signals including, but not limited to, an audio signal, a video signal, an acceleration signal, a velocity signal, a temperature signal, another suitable signal, or a combination thereof. In various embodiments, one or more received signals can be any number of signals for which one or more spectrograms can be generated. Numerous other embodiments are disclosed herein and variations are within the scope of this disclosure.

Referring back to method 400, once one or more signals are received 410, then method 400 proceeds to block 420. In block 420, one or more spectrograms are generated. For example, referring to FIG. 2, one or more spectrograms may be generated by processor 210. As another example, referring to FIG. 3, one or more spectrograms may be generated by desktop computer 330 and sent to server 350 through network 310 to be analyzed. In one embodiment, tablet computer 320 receives an audio file from server 350 and generates one or more spectrograms to be analyzed by the tablet computer 320.

Figure 5:
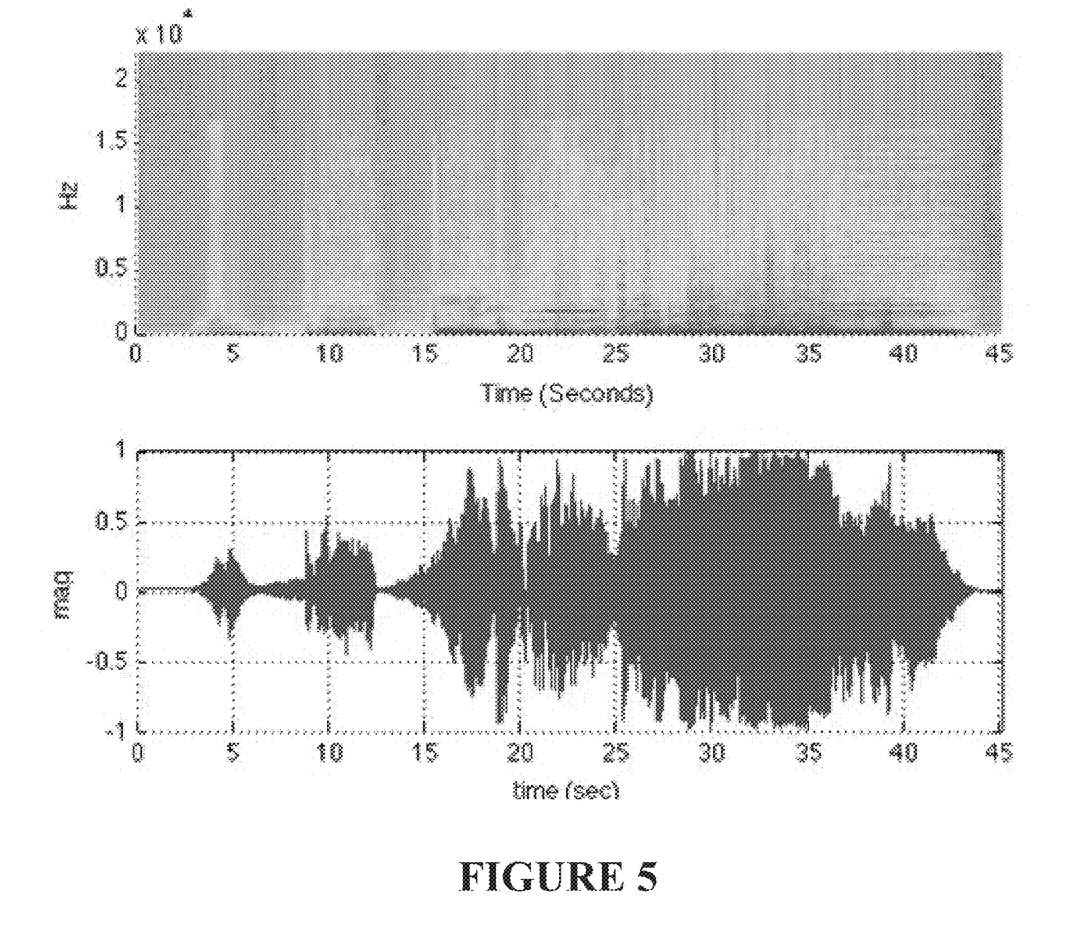
FIG. 5 illustrates aspects of visual processing of spectrograms to generate haptic effects in accordance with an embodiment.

One or more spectrograms can be generated in any number of ways. In one embodiment, a Fourier transform of a time window of a time domain of a signal may be calculated and used to generate one or more spectrograms. Such an embodiment can product a three-dimensional matrix with one dimension representing time sections, another dimension representing frequencies, and a third dimension representing Fourier transform values. These values may be used to generate a spectrogram, such as a two-dimensional image with the horizontal axis representing time, the vertical axis representing frequency, and the color at a particular frequency and time representing a Fourier transform value. For example, the top plot in FIG. 5 shows a two-dimensional representation of a spectrogram of a video clip corresponding to the time domain representation of the audio signal shown in the bottom plot in FIG. 5. As shown in FIG. 5, the color intensity of the top plot represents the FFT magnitude for each time window. Furthermore, as shown in FIG. 5, the top plot is a two-dimensional image and can be processed to determine one or more haptic effects as discussed herein.

One or more spectrograms can be generated and/or a generated spectrogram can be divided into multiple spectrograms in any number of ways. In one embodiment, a spectrogram is generated based at least in part on a time window of one or more received signals. For example, a time window of a time domain of a signal can be calculated and used to generate a spectrogram. In some embodiments, the time window can be any suitable time window such as 1 millisecond, 10 milliseconds, 25 milliseconds, 50 milliseconds, 75 milliseconds, 100 milliseconds, or any other suitable time window. In some embodiments, a spectrogram is generated by at least calculating a Fourier transform for at least one segment of a signal, such as an audio signal and/or another suitable signal. One or more segments can correspond to values of the signal, such as the audio signal, in a respective time window. In some embodiments, one or more segments of the signal used to generate a spectrogram at least partially overlaps. In other embodiments, one or more segments of the signal used to generate a spectrogram does not overlap with another segment of the signal. Numerous other embodiments are disclosed herein and variations are within the scope of this disclosure.

Figure 6:
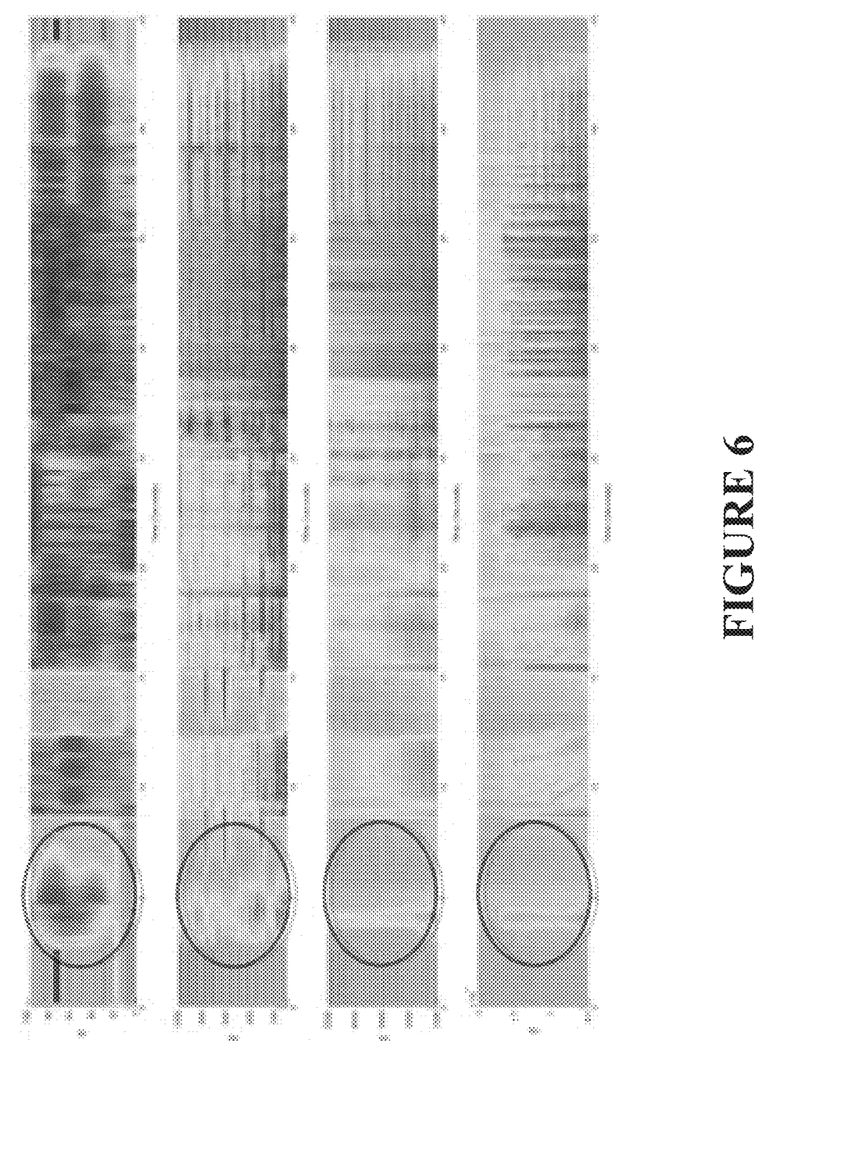
FIG. 6 illustrates aspects of visual processing of spectrograms to generate haptic effects in accordance with an embodiment.

In some embodiments, a spectrogram is divided into multiple spectrograms based at least in part on frequency and/or time. In other embodiments separate spectrograms may be generated based at least in part on frequency, time, and/or time windows. For example, FIG. 6 illustrates aspects of visual processing of spectrograms to generate haptic effects in accordance with an embodiment. As shown in FIG. 6, the top image is a spectrogram of an audio signal displaying frequencies between 0 and 100 Hz, the next image is a spectrogram of the same audio signal but corresponding to frequencies between 100 and 1000 Hz, the third image is a spectrogram of the same audio signal but corresponding to frequencies between 1000 and 5000 Hz, and the fourth image is a spectrogram of the same audio signal but corresponding to frequencies between 500 and the Nyquist frequency. Spectrograms can be generated for any number of frequencies or a previously-generated spectrogram can be divided into multiple spectrograms for any number of frequencies.

In some embodiments, generating the spectrogram comprises generating one or more two-dimensional images. A generated two-dimensional image may correspond to a first frequency range associated with the signal. In some embodiments, the two-dimensional image is segmented into a plurality of two-dimensional images. One or more of the images in the plurality of two-dimensional images may comprise a respective frequency range. The respective frequency range may be a frequency range within the frequency range associated with the spectrogram. Each image in the plurality of two-dimensional images may correspond with a different frequency range than other image in the plurality of two-dimensional images. In some embodiments, the frequency range of a particular image in the plurality of two-dimensional images partially overlaps with the frequency range of another image in the plurality of two-dimensional image. In some embodiments, generating the spectrogram comprises generating a plurality of spectrograms. One or more of the spectrograms may correspond with a frequency range associated with a received signal. In other embodiments, the spectrograms correspond with distinct frequency ranges associated with the signal. Numerous other embodiments are disclosed herein and variations are within the scope of this disclosure.

Referring back to method 400, once one or more spectrograms have been generated 420, then method 400 proceeds to block 430. In block 430, one or more haptic effects are determined. For example, referring to FIG. 2, one or more haptic effects may be determined by processor 210 based at least in part on one or more of the generated spectrograms. As another example, referring to FIG. 3, one or more haptic effects may be determined by desktop computer 330 based at least in part on a database of characteristics that correspond with one or more haptic effects. The database of characteristics may be stored in the desktop computer 330 and/or in one or more databases, such as database 360, in communication with server 350 and in communication with the desktop computer 330 through network 310.

One or more haptic effects can be determined in any number of ways. For example, in one embodiment, a haptic effect is determined based at least in part on one or more spectrograms. For instance, intensity variations over time and/or frequency can be analyzed to determine one or more haptic effects. As another example, image processing techniques can be applied to one or more spectrograms to determine one of more haptic effects. Such processing techniques include, but are not limited to, edge detection, thresholding, clustering, and/or color histogram estimation. In one embodiment, an edge detection technique, such as gradient estimation, is used to locate areas of transition between characteristics in a spectrogram. In another embodiment, a thresholding technique is used if a small number of gray or color levels is present in a spectrogram. Thus, in some embodiments, a spectrogram can be converted into a grayscale or a black and white image and a thresholding technique can be applied to this image to determine one or more haptic effects. In some embodiments, one or more spectrograms can be partitioned into a given number of clusters that have contiguous pixels with similar characteristics. The partitions may be analyzed to determine one or more haptic effects. In other embodiments, hue, saturation, and lightness (HLS), hue, saturation, and value (HSV), hue, saturation, and intensity (HSI), and/or red, green, blue (RGB) values are analyzed in one or more spectrograms to identify regions with similar histograms. Numerous other embodiments are disclosed herein and variations are within the scope of this disclosure.

In some embodiments, one or more haptic effects can be determined at least in part by matching haptic effects with regions of one or more spectrograms. For example, if regions within one or more spectrograms are spaced apart at regular intervals (e.g., in time), then a haptic effect corresponding to a beat may be determined. Thus, in one embodiment, beats in a received signal can be identified from one or more spectrograms generated for the received signal and can be used to output haptic effects corresponding to the identified beats. As another example, changes between one region and another region in one or more spectrograms can be used to determine a transition from one characteristic to another characteristic, such as a transition from one sound to another sound, in a received signal. In one embodiment, a determination is made that a haptic effect should be output before a determined transition from one characteristic to another characteristic in a received signal based at least in part on a transition between the characteristics in a spectrogram for the received signal. In another embodiment, a determination is made that a haptic effect should be output after a determined transition from one characteristic to another characteristic in a received signal based at least in part on a transition between the characteristics in a spectrogram for the received signal.

In some embodiments, determining a characteristic of the spectrogram comprises applying at least one technique to the spectrogram to generate a plurality of regions. In some embodiments, a subset of the plurality of regions is matched with at least one haptic effect. Determining a haptic effect may comprise analyzing a subset of a plurality of spectrograms for a characteristic corresponding to a predefined haptic effect. If the characteristic is located within the subset of the plurality of spectrograms then the predefined haptic effect may be selected. Numerous other embodiments are disclosed herein and variations are within the scope of this disclosure.

In some embodiments, one or more generated spectrograms for a signal target an entire frequency range or different frequency ranges. For example, the spectrogram shown in the top plot in FIG. 5 shows a spectrogram of an audio signal over all possible frequencies in the signal (e.g., 0 Hz to the Nyquist frequency in this figure). In some embodiments, a spectrogram, such as the spectrogram shown in FIG. 5, provides information that can be used to determine one or more haptic effects. In other embodiments, more detailed information in two or more frequency ranges are used to determine one or more haptic effects For example, as shown in FIG. 6, the top image is a spectrogram of an audio signal displaying frequencies between 0 and 100 Hz, the next image is a spectrogram of the same audio signal but corresponding to frequencies between 100 and 1000 Hz, the third image is a spectrogram of the same audio signal but corresponding to frequencies between 1000 and 5000 Hz, and the fourth image is a spectrogram of the same audio signal but corresponding to frequencies between 500 and the Nyquist frequency. As can be seen in FIG. 6, spectrograms based at least in part on different frequency ranges provide different information that can be used to determine one or more haptic effects. For example, at various times, each frequency band shown in FIG. 6 contains different intensity information as demonstrated by the four circles, each covering the same period of time but at different frequency bands. In some embodiments, one or more of these frequency bands (e.g., frequency ranges) are analyzed for one or more characteristics. One or more haptic effects corresponding to one or more characteristics may be determined by analyzing any or all of the frequency ranges of one or more spectrograms.

One or more frequency ranges of one or more spectrograms may be analyzed for characteristic(s) that correspond with one or more predetermined haptic effects. For example, a haptic effect may be selected if a particular characteristic is located in a particular frequency range of one or more spectrograms. Thus, in some embodiments, a plurality of frequency ranges of one or more spectrograms for a received signal are analyzed. In one embodiment, an electronic device 200 that receives a signal generates one or more spectrograms for one or more frequency ranges and analyzes at least some of the spectrograms for characteristics corresponding to haptic effects. For example, electronic device 200 may have a library of predefined haptic effects that correspond with characteristics. In this embodiment, one or more generated spectrograms can be analyzed to determine if the characteristic is present in the spectrograms. In other embodiments, electronic device 200 may comprise or be in communication with a database of predefined haptic effects and/or a database of predefined characteristics and/or associations between predefined haptic effects and predefined characteristics. Numerous other embodiments are disclosed herein and variations are within the scope of this disclosure.

In response to determining that a spectrogram has a characteristic, one or more haptic effects corresponding to the characteristic may be determined based at least in part on the library of predefined haptic effects and/or correlations between predefined haptic effects and particular characteristics. In some embodiments, the timing for one or more determined haptic effects is based at least in part on a time when the characteristic is found in one or more spectrograms. For example, a determination may be made that a haptic effect corresponding to a characteristic should be output before the characteristic occurs (e.g., 5 ms before the characteristic, 50 ms before the characteristic, or any other suitable time before the characteristic occurs). As another example, a determination can be made that a haptic effect corresponding to a characteristic should be output when the characteristic occurs. In other embodiments, a determination is made that a haptic effect corresponding to a characteristic should be output before, when, during, or after a characteristic occurs. In some embodiments, a determination is made that a haptic effect should be output during a transition from one characteristic to another characteristic. Numerous other embodiments are disclosed herein and variations are within the scope of this disclosure.

One or more of the frequency ranges may be distinct from other analyzed frequency ranges and can be analyzed to determined one or more characteristics and/or one or more haptic effects. For example, referring again to FIG. 6, in one embodiment each of the four frequency ranges are independently analyzed for one or more characteristics and/or one or more haptic effects. Thus, in FIG. 6, a spectrogram of a frequency band of 100 to 1000 Hz is analyzed separately from a spectrogram of a frequency band of 1000 to 5000 Hz. In some embodiments, once two or more of the frequency bands have been independently analyzed to determine haptic effects, a single haptic track is determined based at least in part on the determined haptic effects for the independently analyzed frequency bands.

In other embodiments, two or more haptic tracks are determined based at least in part on the independently analyzed frequency bands. For example, referring back to FIG. 6, a first haptic track may be determined based at least in part on a spectrogram of a frequency band of 100 to 1000 Hz and a second haptic track may be determined based at least in part on a spectrogram of a frequency band of 1000 to 5000 Hz. In other embodiments, some haptic effect tracks based on two or more frequency bands are combined into a single haptic effect track and other haptic effect tracks based on another frequency band is maintained as a separate haptic effect track. Thus, one or more haptic effect tracks can be generated based at least in part on one or more generated spectrograms. In some embodiments two or more spectrograms are analyzed independently and then combined into a haptic effect track. In this embodiment, additional haptic effects can be added to and/or subtract from a combined haptic effect track based at least in part on haptic effects determined for each spectrogram. For example, if both spectrograms indicate that a particular haptic effect should be output but the timing for the haptic effect does not match exactly, a determination may be made to output the haptic effect only once at one of the two times, an average of the two times, etc. As another example, if both spectrograms indicate that haptic effects should be output at the same or a similar time, then a single haptic effect may be determined for the combined track that has a larger magnitude than either of the individually determined haptic effects. Numerous other embodiments are disclosed herein and variations are within the scope of this disclosure.

In one embodiment, a user is able to select one or more haptic effect tracks. For example, as discussed above, two or more haptic effect tracks can be determined based at least in part on one or more frequency bands of one or more spectrograms for a received signal. In one embodiment, two or more of the determined haptic effect tracks are presented to a user, such as in a user interface, and the user can select which haptic output track or tracks to use. Thus, in one embodiment, a first haptic effect track corresponds with haptic effects determined in a first frequency range and a second haptic effect track corresponds with haptic effects determined in a second frequency range. In other embodiments, two, three, four, five, or more haptic effect tracks are presented to a user based at least in part on one or more frequency ranges. In some embodiments, a user can choose to combine two or more of the haptic tracks to create a single haptic output track. Numerous other embodiments are disclosed herein and variations are within the scope of this disclosure.

Referring back to method 400, once one or more haptic output signals have been determined 430, the method 400 proceeds to block 440. In block 440, one or more haptic output signals are generated. For example, referring to FIG. 2, electronic device 200 may generate one or more haptic output signals. As another example, referring to FIG. 3, tablet computer 320 may generate one or more haptic output signals. In one embodiment, tablet computer 320 may send one or more generated haptic output signals to another device, such desktop computer 330 shown in FIG. 3. In an embodiment, one or more of the haptic output signals is based at least in part on a modified haptic effect. For example, a haptic output signal may be configured to cause one or more haptic output devices to output a modified haptic effect. Thus, for example, if an intensity parameter corresponding to a determined haptic effect has been modified, then the haptic output signal may be configured to cause a haptic output device to output a haptic effect that has an intensity corresponding to the modified intensity parameter. Numerous other embodiments are disclosed herein and variations are within the scope of this disclosure.

In some embodiments, the processor 210 generates a single signal when an event occurs. For example, in one embodiment, the processor 210 generates a signal configured to cause a haptic output device, such as haptic output device 240 or haptic output device 260, to output a haptic effect. The haptic effect may indicate that an object is currently displayed on the display 230, that an object is about to be displayed on the display 230, that an object is approaching, that an event has occurred, that an event is about to occur, or a combination thereof.

In other embodiments, the processor 210 generates two, three, or more signals. For example, in one embodiment, the processor 210 generates a first signal configured to cause a first haptic effect and a second signal configured to cause a second haptic effect. In some embodiments, the processor 210 generates a different signal for each event that occurs. In various embodiments, the processor 210 generates one or more signals configured to cause the touch-sensitive display 230, the communication interface 250, the haptic output device 240, the haptic output device 260, the sensor 270, other components of the device 200, other components of devices in communication with the device 200, or a combination thereof to output one or more of the generated signals, such as a video signal, audio signal, haptic output signal, and/or a communication signal. For example, in one embodiment, the processor 210 generates a signal when the event occurs where the signal is configured to cause a haptic output device in another device to cause a haptic effect. In one embodiment, the processor 210 sends the signal to the other device through the communication interface 250.

In one embodiment, a generated signal includes a command for a device or component to perform a specified function, such as to output a haptic effect or transmit a message to a remote device. In another embodiment, a generated signal includes parameters which are used by a device or component receiving the command to determine a response or some aspect of a response. Parameters may include various data related to, for example, magnitudes, frequencies, durations, or other parameters that a haptic output device can use to determine a haptic effect, output a haptic effect, or both. For example, in one embodiment, the processor 210 generates a signal configured to cause haptic output device 240 to output a haptic effect. In such an embodiment, the signal may include a pressure parameter that the haptic output device 240 uses to determine the intensity of the haptic effect to output. For example, according to one embodiment, the larger the pressure parameter the haptic output device 240 receives, the more intense the haptic effect that is output.

In one embodiment, an intensity parameter is used by a haptic output device to determine the intensity of a haptic effect. In this embodiment, the greater the intensity parameter, the more intense the haptic effect that is output. In one embodiment, the intensity parameter is based at least in part on sensor information, such as speed, direction, etc., of a remotely controllable device when an event occurs. Thus, according to one embodiment, a larger intensity parameter is sent to a haptic output device when an event occurs while the remotely controllable device is travelling at a faster speed than when an event occurs while the remotely controllable device is travelling at a slower speed. A signal may include data that is configured to be processed by a haptic output device, display, communication interface, sensor, or other components of a device or in communication with a device in order to determine an aspect of a particular response.

Referring back to method 400, once one or more haptic output signals have been generated 440, the method 400 proceeds to block 450. In block 450, one or more generated haptic output signals are output to one or more haptic output devices. For example, referring to FIG. 2, one or more generated haptic output signals may be output to haptic output device 240 and/or haptic output device 260. As another example, referring to FIG. 3, one or more haptic output signals generated by desktop computer 330 may be output to one or more haptic output devices in tablet computer 320 through network 310. In one embodiment, a generated haptic output signal is sent to one haptic output device. In other embodiments, a generated haptic output signal is sent to two, three, four, or more haptic output devices. In some embodiments, two, three, four, or more generated haptic output signals are sent to a haptic output device. In other embodiments, two, three, four, or more generated haptic output signals are set to two, three, four, or more haptic output devices. Numerous other embodiments are disclosed herein and variations are within the scope of this disclosure.

In various embodiments, the processor 210 may output one or more generated signals to any number of devices. For example, the processor 210 may output one signal to the communication interface 250. In one embodiment, the processor 210 may output one generated signal to the touch-sensitive display 230, another generated signal to the communication interface 250, and another generated signal to the haptic output device 260. In other embodiments, the processor 210 may output a single generated signal to multiple components or devices. For example, in one embodiment, the processor 210 outputs one generated signal to both haptic output device 240 and haptic output device 260. In another embodiment, the processor 210 outputs one generated signal to haptic output device 240, haptic output device 260, and communication interface 250. In still another embodiment, the processor 210 outputs one generated signal to both haptic output device 240 and haptic output device 260 and outputs a second generated signal to the touch-sensitive display 230.

As discussed above, the processor 210 may output one or more signals to the communication interface 250. For example, the processor 210 may output a signal to the communication interface 250 instructing the communication interface 250 to send data to another component or device in communication with the device 200. In such an embodiment, the communication interface 250 may send data to the other device and the other device may perform a function such as updating a display associated with the other device or the other device may output a haptic effect. Thus, in some embodiments, a second device may output a haptic effect based at least in part upon an interaction with a first device in communication with the second device. In other embodiments, a second device may perform any number of functions such as, for example, updating a display associated with the second device or outputting a sound to a sensor associated with the second device based at least in part on an interaction with a first remote control 200.

In various embodiments, after the processor 210 outputs a signal to a component, the component may send the processor 210 a confirmation indicating that the component received the signal. For example, in one embodiment, haptic output device 260 may receive a command from the processor 210 to output a haptic effect. Once haptic output device 260 receives the command, the haptic output device 260 may send a confirmation response to the processor 210 that the command was received by the haptic output device 260. In another embodiment, the processor 210 may receive completion data indicating that a component not only received an instruction but that the component has performed a response. For example, in one embodiment, haptic output device 240 may receive various parameters from the processor 210. Based on these parameters haptic output device 240 may output a haptic effect and send the processor 210 completion data indicating that haptic output device 240 received the parameters and outputted a haptic effect. Numerous other embodiments are disclosed herein and variations are within the scope of this disclosure.

General

While the methods and systems herein are described in terms of software executing on various machines, the methods and systems may also be implemented as specifically-configured hardware, such as field-programmable gate array (FPGA) specifically configured to execute the various methods. For example, embodiments can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A system comprising:
 a processor configured to:
  receive an input signal from an input device;
  generate a spectrogram based at least in part on the input signal;
  determine a haptic effect based at least in part on the spectrogram, wherein determining a haptic effect comprises for each of a plurality of frequency ranges:
   analyzing the spectrogram over a frequency range for a characteristic; and
   determining a haptic effect corresponding to the characteristic; and
  transmit a haptic signal associated with the haptic effect to a haptic output device configured to output the haptic effect.

2. The system of claim 1, wherein the input signal comprises one or more of: an audio signal, a video signal, an acceleration signal, a velocity signal, or a temperature signal.

3. The system of claim 1, wherein generating the spectrogram comprises calculating a Fourier transform for at least one segment of the input signal, each segment corresponding to values of the input signal in a respective time window.

4. The system of claim 3, wherein the at least one segment comprises a first segment and a second segment, the second segment at least partially overlapping with the first segment.

5. The system of claim 3, wherein the at least one segment comprises a first segment and a second segment, the second segment not overlapping with the first segment.

6. The system of claim 1, wherein generating the spectrogram comprises generating a two-dimensional image corresponding to a first frequency range associated with the input signal.

7. The system of claim 6, wherein generating the spectrogram further comprises segmenting the two-dimensional image into a plurality of two-dimensional images, each image in the plurality of two-dimensional images comprising a respective frequency range within the first frequency range.

8. The system of claim 1, wherein determining the characteristic of the spectrogram comprises:
 for each of a plurality of predefined characteristics, each predefined characteristic corresponding to at least one predefined haptic effect:
  determining whether the spectrogram comprises that predefined characteristic; and
  in response to determining that the spectrogram comprises that predefined characteristic, selecting at least one predefined haptic effect corresponding with that predefined characteristic as the determined haptic effect.

9. A method comprising:
 receiving an input signal from an input device;
 generating a spectrogram based at least in part on the input signal;
 determining a haptic effect based at least in part on the spectrogram, wherein determining a haptic effect comprises for each of a plurality of frequency ranges:
  analyzing the spectrogram over a frequency range for a characteristic; and
  determining a haptic effect corresponding to the characteristic; and
 transmitting a haptic signal associated with the haptic effect to a haptic output device configured to output the haptic effect.

10. The method of claim 9, wherein the input signal comprises one or more of: an audio signal, a video signal, an acceleration signal, a velocity signal, or a temperature signal.

11. The method of claim 9, wherein generating the spectrogram comprises calculating a Fourier transform for at least one segment of the input signal, each segment corresponding to values of the input signal in a respective time window.

12. The method of claim 11, wherein the at least one segment comprises a first segment and a second segment, the second segment at least partially overlapping with the first segment.

13. The method of claim 11, wherein the at least one segment comprises a first segment and a second segment, the second segment not overlapping with the first segment.

14. The method of claim 9, wherein generating the spectrogram comprises generating a two-dimensional image corresponding to a first frequency range associated with the input signal.

15. A non-transitory computer-readable medium comprising program code, which when executed by a processor is configured to cause the processor to:
receive an input signal from an input device;
generate a spectrogram based at least in part on the input signal;
determine a haptic effect based at least in part on the spectrogram, wherein determining a haptic effect comprises for each of a plurality of frequency ranges:
analyzing the spectrogram over a frequency range for a characteristic; and
determining a haptic effect corresponding to the characteristic; and
transmit a haptic signal associated with the haptic effect to a haptic output device configured to output the haptic effect.

16. The non-transitory computer readable medium of claim 15, wherein the input signal comprises one or more of: an audio signal, a video signal, an acceleration signal, a velocity signal, or a temperature signal.

17. The non-transitory computer readable medium of claim 15, wherein generating the spectrogram comprises calculating a Fourier transform for at least one segment of the input signal, each segment corresponding to values of the input signal in a respective time window.

18. The non-transitory computer readable medium of claim 17, wherein the at least one segment comprises a first segment and a second segment, the second segment at least partially overlapping with the first segment.

19. The non-transitory computer readable medium of claim 17, wherein the at least one segment comprises a first segment and a second segment, the second segment not overlapping with the first segment.

20. The non-transitory computer readable medium of claim 15, wherein generating the spectrogram comprises generating a two-dimensional image corresponding to a first frequency range associated with the input signal.

* * * * *